US008660227B2

(12) United States Patent
Suzuki et al.

(10) Patent No.: US 8,660,227 B2
(45) Date of Patent: Feb. 25, 2014

(54) RADIO COMMUNICATION SYSTEM, RECEIVER, AND TRANSMITTER

(75) Inventors: Fumio Suzuki, Chiba (JP); Shoji Hatano, Nagoya Aichi (JP); Noritoshi Hino, Nagoya Aichi (JP); Masahito Taneda, Nagoya Aichi (JP); Yoshimisa Kimura, Chiba (JP); Koichi Moriya, Chiba (JP)

(73) Assignee: OTSL Inc. (JP)

( * ) Notice: Subject to any disclaimer, the term of this patent is extended or adjusted under 35 U.S.C. 154(b) by 313 days.

(21) Appl. No.: 12/737,629

(22) PCT Filed: Jul. 30, 2009

(86) PCT No.: PCT/JP2009/063611
§ 371 (c)(1),
(2), (4) Date: Apr. 12, 2011

(87) PCT Pub. No.: WO2010/016427
PCT Pub. Date: Feb. 11, 2010

(65) Prior Publication Data
US 2011/0182371 A1    Jul. 28, 2011

(30) Foreign Application Priority Data
Aug. 5, 2008  (JP) .................................. 2008-202257

(51) Int. Cl.
*H04L 7/00* (2006.01)
(52) U.S. Cl.
USPC ........... 375/354; 375/219; 375/295; 375/316; 375/359; 375/362
(58) Field of Classification Search
USPC ......... 375/219, 229, 259, 260, 271, 295, 316, 375/322, 354, 355, 358, 362
See application file for complete search history.

(56) References Cited

U.S. PATENT DOCUMENTS

| 7,792,158 B1 * | 9/2010 | Cho et al. ...................... 370/518 |
| 8,089,989 B2 * | 1/2012 | Goshen et al. ................ 370/503 |
| 2003/0177154 A1 * | 9/2003 | Vrancic ........................ 708/160 |
| 2010/0246660 A1 * | 9/2010 | Matsuo et al. ................ 375/239 |
| 2011/0015769 A1 * | 1/2011 | Haatainen ...................... 700/94 |
| 2011/0207501 A1 * | 8/2011 | Moriya et al. ............. 455/550.1 |
| 2013/0077468 A1 * | 3/2013 | Ma et al. ........................ 370/210 |
| 2013/0093496 A1 * | 4/2013 | Waters et al. ................. 327/365 |

FOREIGN PATENT DOCUMENTS

| JP | 2 65328 | 3/1990 |
| JP | 2005159599 | 6/2005 |
| JP | 200674326 | 3/2006 |
| JP | 2006074326 A * | 3/2006 |

* cited by examiner

*Primary Examiner* — Hirdepal Singh
(74) *Attorney, Agent, or Firm* — Adams & Wilks

(57) ABSTRACT

A radio communication system has a transmitter and a receiver that transmits and receives, respectively, synchronization signals. The transmitter has a multiple-synchronization-signal generation section configured to generate the synchronization signals, a radio circuit configured to transmit the synchronization signals in a predetermined transmission cycle from a start time of the predetermined transmission cycle and with an interval shorter than the predetermined transmission cycle, and a synchronization signal sequence number generation section configured to assign a sequence number to each of the synchronization signals. The receiver has a synchronization signal detection section configured to detect any one of the synchronization signals transmitted by the transmitter, and has a clock error correction section configured to correct an error of a reference clock based on the sequence number assigned by the synchronization signal sequence number generation section to the synchronization signal detected by the synchronization signal detection section.

6 Claims, 10 Drawing Sheets

HARDWARE CONFIGURATIONS OF TRANSMITTER AND RECEIVER

FUNCTIONAL BLOCK DIAGRAM ACCORDING TO SECOND EMBODIMENT

FUNCTIONAL BLOCK DIAGRAM ACCORDING TO THIRD EMBODIMENT

FUNCTIONAL BLOCK DIAGRAM ACCORDING TO PRIOR ART

RADIO COMMUNICATION SYSTEM, RECEIVER, AND TRANSMITTER

CROSS-REFERENCE TO RELATED APPLICATIONS

This application is a U.S. national stage application of International Application No. PCT/JP2009/063611 filed Jul. 30, 2009, claiming a priority date of Aug. 5, 2008, and published in a non-English language.

BACKGROUND OF THE INVENTION

1. Technical Field

The present invention relates to a radio communication system, a receiver, and a transmitter, which are capable of reducing an operation time period of a reception circuit of the receiver and achieving reduction in power consumption in the receiver when, in the radio communication system, the receiver, such as a mobile phone, receives a synchronization signal transmitted from the transmitter, such as a base station device, and synchronizes a reference clock of the receiver with a reference clock of the transmitter.

2. Background Art

FIG. 9 is a diagram illustrating an example of configurations of a conventional transmitter and a conventional receiver which perform communication by using TDMA radio frames.

In FIG. 9, a transmitter 101C includes a radio circuit 102 for transmitting a radio signal via an antenna 103, and a transmission data control section 111C. The transmission data control section 111C includes a synchronization signal generation section 112C for creating a synchronization signal, and also has transmission data 113 stored therein. Based on the synchronization signal generated by the synchronization signal generation section 112C and the transmission data 113, a transmission signal generation section 114 generates a transmission signal to be transmitted using a radio frame. The transmission signal generated by the transmission signal generation section 114 is transmitted from the radio circuit 102 to a receiver 201C via the antenna 103.

The receiver 201C includes a radio circuit 202 for receiving the radio signal via an antenna 203, a data reception section 211C, a clock error correction section 213, and a reception operation control section 214. A synchronization signal detection section 212 of the data reception section 211C detects the synchronization signal in the radio frame transmitted from the transmitter 101C, and, based on the synchronization signal detected by the synchronization signal detection section 212, the clock error correction section 213 performs correction so that a reference clock of the receiver 201C is synchronized with a reference clock of the transmitter 101C. Based on the corrected reference clock, the reception operation control section 214 controls a data reception operation performed by the data reception section 211C.

Further, FIG. 10 is a diagram for describing a clock correction operation performed by the conventional transmitter and the conventional receiver illustrated in FIG. 9. As illustrated in FIG. 10, the transmitter 101C regularly transmits the radio frame (basic frame), and, in a leading portion thereof, the synchronization signal is transmitted.

Meanwhile, an error occurs between the reference clocks counted in the transmitter 101C and the receiver 201C, respectively. Further, this clock error increases with a lapse of time. For this reason, the receiver 201C performs a search for the synchronization signal regularly (for example, at intervals of 15 seconds), to thereby make the reference clock of its own constantly in synchronization with the reference clock of the transmitter 101C.

In the case where the receiver 201O receives the synchronization signal, an error occurs between the reference clocks counted in the transmitter 101C and the receiver 201C, respectively, and hence, in order to receive the synchronization signal, the receiver 201C needs to start a reception operation earlier by a time period corresponding to a clock error (±Tm), which is an operation guarantee period, that is, by a time period Tm, to thereby achieve synchronization. Accordingly, in the receiver, an extended reception time period is required in order to achieve synchronization with the clock of the transmitter. This has prevented the receiver from reducing its power consumption, and it has been desired that this problem be solved.

It is noted that, as a prior art, there is disclosed a polling system in mobile radio communication (see Patent Literature 1). This polling system has an object to provide such a polling system that is capable of decreasing the probability of occurrence of a malfunction without any need to extend a time period required for the polling compared to a conventional system, and that, even if a malfunction has occurred, is capable of keeping the malfunction from adversely affecting the next time slot. Thus, such a polling system is not intended to solve the above-mentioned problem that extra power consumption is required in order to achieve the clock synchronization in the receiver.

CITATION LIST

Patent Literature

[PTL 1] JP 02-65328 A

As described above, with the conventional transmitter and the conventional receiver, in order for the receiver to receive the synchronization signal, the receiver needs to be operated earlier by the time period corresponding to the clock error (±Tm), which is the operation guarantee period, that is, by the time period Tm, and to achieve synchronization before the clock error in the receiver exceeds the time period Tm. This requires an extended reception time period for achieving the clock synchronization, which therefore prevents the receiver from reducing its power consumption. Accordingly, it has been desired that this problem be solved.

In view of the above-mentioned circumstances, the present invention has been made, and an object thereof is to provide a radio communication system, a receiver, and a transmitter, which are capable of reducing an operation time period of a reception circuit of the receiver and achieving reduction in power consumption even if there is a clock error between the transmitter and the receiver.

Problem Summary of the Invention

In order to solve the above-mentioned problem, the present invention has been made, and according to the present invention, there is provided a radio communication system, including: a transmitter for transmitting a synchronization signal in a predetermined transmission cycle; and a receiver having set therein in advance a reception interval for receiving the synchronization signal of the transmitter, and being configured to be activated with the reception interval, and to correct an error of a reference clock by detecting the synchronization signal transmitted from the transmitter, in which: the transmitter includes multiple-synchronization-signal transmission means for continuously transmitting, from a start time of the predetermined transmission cycle, the synchronization signal a plurality of times with an interval shorter than the predetermined transmission cycle; and the receiver includes synchronization signal detection means for receiving, after the activation, any one of a plurality of the synchronization signals transmitted from the transmitter.

In the radio communication system having the above-mentioned configuration according to the present invention, the synchronization signal is continuously transmitted from the transmitter the plurality of times in a short period of time, and the receiver receives only one of the plurality of the continuously-transmitted synchronization signals. Then, based on the received synchronization signal, the error of the reference clock is corrected.

With this configuration, it is possible to reduce a time period for the reception operation, compared to the conventional case in which, in order to receive the synchronization signal transmitted only once in the predetermined transmission cycle, the receiver starts the reception operation ahead of time in consideration of the error of the reference clock. Therefore, it is possible to reduce the power consumption of the receiver, thereby allowing the life of a battery of the receiver to last longer.

Further, in the radio communication system according to the present invention, the transmitter further includes identification information assigning means for assigning identification information to each of the plurality of the synchronization signals, and the receiver further includes clock error correction means for correcting the error of the reference clock based on the identification information contained in the received synchronization signal.

In the radio communication system having the above-mentioned configuration according to the present invention, pieces of the identification information are assigned to the plurality of the synchronization signals continuously transmitted from the transmitter, and the receiver corrects the error of the reference clock based on the identification information contained in the received synchronization signal.

With this configuration, the receiver calculates a temporal position of a leading or arbitrary other synchronization signal based on the identification information of the received synchronization signal, and thus can correct the error of the reference clock based on the temporal position of the synchronization signal.

Further, in the radio communication system according to the present invention, the identification information includes a sequence number or a time stamp.

In the radio communication system having the above-mentioned configuration according to the present invention, the sequence numbers or the time stamps are assigned to the plurality of the synchronization signals continuously transmitted from the transmitter, and the receiver calculates the temporal position of the leading or arbitrary other synchronization signal based on the sequence number or the time stamp contained in the received synchronization signal, to thereby perform correction on the reference clock based on the synchronization signal.

With this configuration, in addition to the effect of achieving reduction in power consumption of the receiver, by calculating, based on the sequence number or the time stamp, the temporal position of the leading or arbitrary other synchronization signal, the receiver can correct the error of the reference clock based on the temporal position of the synchronization signal.

Further, according to the present invention, there is provided a receiver which is used in a radio communication system including: a transmitter for transmitting a synchronization signal in a predetermined transmission cycle; and a receiver having set therein in advance a reception interval for receiving the synchronization signal of the transmitter, and being configured to be activated with the reception interval, and to correct an error of a reference clock by detecting the synchronization signal transmitted from the transmitter, the transmitter continuously transmitting, from a start time of the predetermined transmission cycle, the synchronization signal a plurality of times with an interval shorter than the predetermined transmission cycle, the receiver including: synchronization signal detection means for receiving, after the activation, any one of a plurality of the synchronization signals transmitted from the transmitter; and clock error correction means for correcting the error of the reference clock based on the received synchronization signal.

The receiver having the above-mentioned configuration according to the present invention receives only one of the synchronization signals continuously transmitted from the transmitter the plurality of times in a short period of time. Then, based on the received synchronization signal, correction is performed on the reference clock.

With this configuration, it is possible to reduce the time period for the reception operation, compared to the conventional case in which, in order to receive the synchronization signal transmitted only once in the predetermined transmission cycle, the receiver starts the reception operation ahead of time in consideration of the clock error. Therefore, it is possible to reduce the power consumption of the receiver, thereby allowing the life of a battery of the receiver to last longer.

Further, according to the present invention, there is provided a receiver which is used in a radio communication system including: a transmitter for transmitting a synchronization signal in a predetermined transmission cycle; and a receiver having set therein in advance a reception interval for receiving the synchronization signal of the transmitter, and being configured to be activated with the reception interval, and to correct an error of a reference clock by detecting the synchronization signal transmitted from the transmitter, the transmitter continuously transmitting, from a start time of the predetermined transmission cycle, the synchronization signal having identification information assigned thereto, a plurality of times with an interval shorter than the predetermined transmission cycle, the receiver including: synchronization signal detection means for receiving, after the activation, any one of a plurality of the synchronization signals transmitted from the transmitter; and clock error correction means for correcting the error of the reference clock based on the identification information contained in the received synchronization signal.

The receiver having the above-mentioned configuration according to the present invention receives only one of the synchronization signals continuously transmitted from the transmitter the plurality of times in a short period of time. Then, the receiver calculates the temporal position of the leading or arbitrary other synchronization signal based on the identification information contained in the received synchronization signal, to thereby perform correction on the reference clock based on the temporal position of the synchronization signal.

With this configuration, it is possible to reduce the time period for the reception operation, compared to the conventional case in which, in order to receive the synchronization signal transmitted only once in the predetermined transmission cycle, the receiver starts the reception operation ahead of time in consideration of the clock error. Therefore, it is possible to reduce the power consumption of the receiver, thereby allowing the life of a battery of the receiver to last longer. Further, by using the identification information of the synchronization signal, the receiver can correct the error of its own reference clock based on the temporal position of an arbitrary synchronization signal out of the plurality of the synchronization signals.

Further, in the receiver according to the present invention, the identification information includes a sequence number or a time stamp.

In the receiver having the above-mentioned configuration according to the present invention, the sequence numbers or the time stamps are assigned to the plurality of the synchronization signals continuously transmitted from the transmitter, and the receiver calculates the temporal position of the leading or other synchronization signal based on the sequence number or the time stamp contained in the received synchronization signal, to thereby perform correction on the reference clock based on the synchronization signal.

With this configuration, in addition to the effect of achieving reduction in power consumption of the receiver, by calculating, based on the sequence number or the time stamp, the temporal position of the leading or arbitrary other synchronization signal out of the plurality of the synchronization signals, the receiver can correct the error of the reference clock based on the temporal position of the synchronization signal.

Further, according to the present invention, there is provided a transmitter which is used in a radio communication system including: a transmitter for transmitting a synchronization signal in a predetermined transmission cycle; and a receiver having set therein in advance a reception interval for receiving the synchronization signal of the transmitter, and being configured to be activated with the reception interval, and to correct an error of a reference clock by detecting the synchronization signal transmitted from the transmitter, the transmitter including multiple-synchronization-signal transmission means for continuously transmitting, from a start time of the predetermined transmission cycle, the synchronization signal a plurality of times with an interval shorter than the predetermined transmission cycle, in which the receiver receives any one of a plurality of the synchronization signals transmitted from the transmitter, and corrects the error of the reference clock based on the synchronization signal.

The transmitter having the above-mentioned configuration according to the present invention continuously transmits the plurality of the synchronization signals. The receiver receives only one of the synchronization signals continuously transmitted from the transmitter the plurality of times. Then, based on the received synchronization signal, correction is performed on the reference clock.

With this configuration, it is possible to reduce the time period for the reception operation, compared to the conventional case in which, in order to receive the synchronization signal transmitted only once in the predetermined transmission cycle, the receiver starts the reception operation ahead of time in consideration of the clock error. Therefore, it is possible to reduce the power consumption of the receiver, thereby allowing the life of a battery of the receiver to last longer.

Further, according to the present invention, there is provided a transmitter which is used in a radio communication system including: a transmitter for transmitting a synchronization signal in a predetermined transmission cycle; and a receiver having set therein in advance a reception interval for receiving the synchronization signal of the transmitter, and being configured to be activated with the reception interval, and to correct an error of a reference clock by detecting the synchronization signal transmitted from the transmitter, the transmitter including: identification information assigning means for assigning identification information to each of a plurality of the synchronization signals; and multiple-synchronization-signal transmission means for continuously transmitting, from a start time of the predetermined transmission cycle, the synchronization signal having the identification information assigned thereto, a plurality of times with an interval shorter than the predetermined transmission cycle, in which the receiver receives any one of the plurality of the synchronization signals transmitted from the transmitter, and corrects the error of the reference clock based on the identification information contained in the synchronization signal.

The transmitter having the above-mentioned configuration according to the present invention assigns the identification information to the each of the plurality of the continuously-transmitted synchronization signals, and transmits the synchronization signals to the receiver. The receiver receives only one of the synchronization signals continuously transmitted from the transmitter the plurality of times. Then, based on the identification information contained in the received synchronization signal, the receiver calculates the temporal position of the leading or arbitrary other synchronization signal, to thereby perform correction on the reference clock based on the temporal position of the synchronization signal.

With this configuration, it is possible to reduce the time period for the reception operation, compared to the conventional case in which, in order to receive the synchronization signal transmitted only once in the predetermined transmission cycle, the receiver starts the reception operation ahead of time in consideration of the clock error. Therefore, it is possible to reduce the power consumption of the receiver, thereby allowing the life of a battery of the receiver to last longer. Further, by using the identification information of the synchronization signal, the receiver can correct the error of its own reference clock based on the temporal position of an arbitrary synchronization signal out of the plurality of the synchronization signals.

Further, in the transmitter according to the present invention, the identification information includes a sequence number or a time stamp.

With this configuration, in addition to the effect of achieving reduction in power consumption of the receiver, by calculating, based on the sequence number or the time stamp, the temporal position of the leading or arbitrary other synchronization signal out of the plurality of the synchronization signals, the receiver can correct the error of the reference clock based on the temporal position of the synchronization signal.

According to the present invention, even if there is a clock error between the transmitter and the receiver, it is possible to receive the synchronization signal transmitted from the transmitter with a reduced operation time period of the reception circuit of the receiver. Therefore, the receiver can achieve reduction in power consumption. Further, the plurality of the synchronization signals are transmitted continuously, and hence there is provided an effect of reducing influence due to radio wave interference.

DETAILED DESCRIPTION OF THE INVENTION

First Embodiment

Hereinbelow, an embodiment of the present invention is described with reference to the attached drawings.

Figure 1:
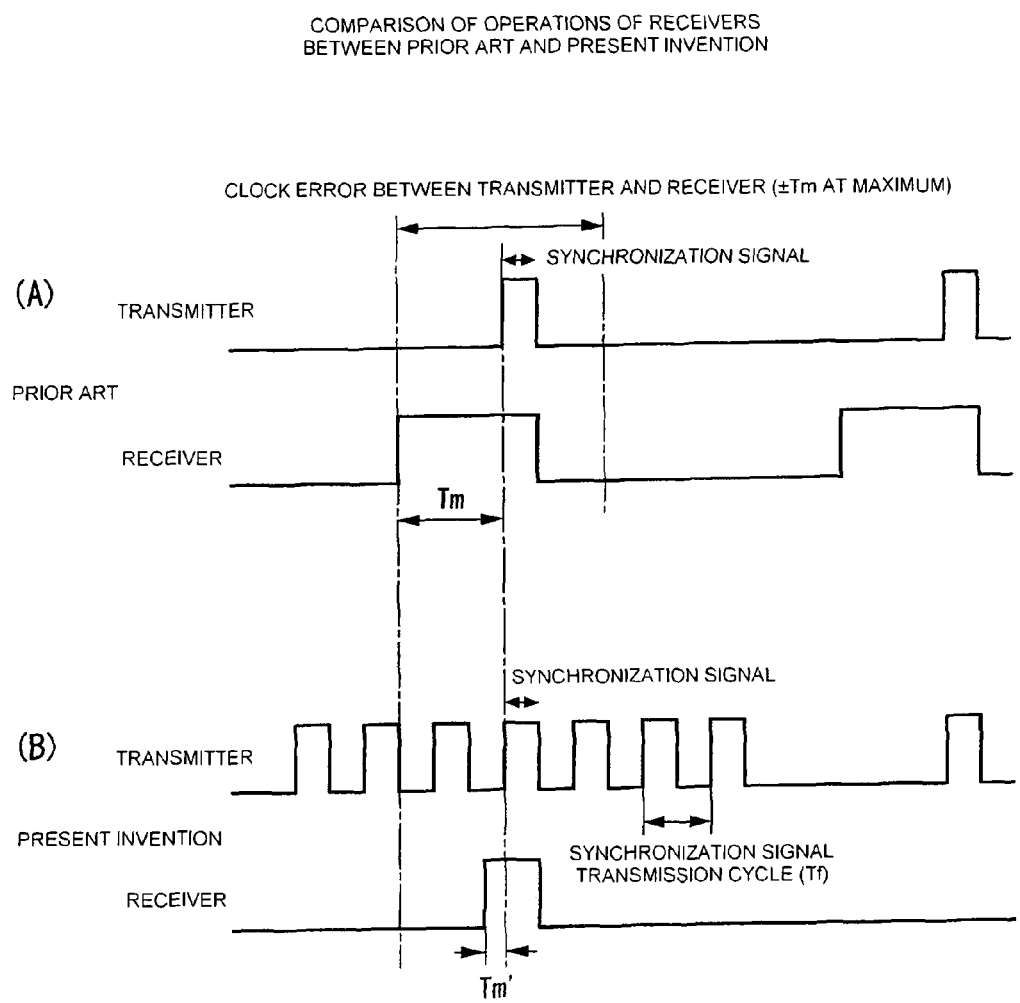
FIGS. 1(A)-1(B) are diagrams for describing operations of a transmitter and a receiver according to a first embodiment of the present invention.

FIG. 1 are diagrams for describing operations of a transmitter and a receiver according to a first embodiment of the present invention. FIG. 1(A) illustrates a case of a conventional method, which is the same as the example illustrated in FIG. 10. Specifically, in the case of the conventional method, the receiver is operated earlier by a time period Tm, thereby achieving synchronization before a clock error in the receiver exceeds the time period Tm. This requires an extended reception time period for achieving clock synchronization, which therefore prevents the receiver from reducing its power consumption.

To address this, in the first embodiment of the present invention, as illustrated in FIG. 1(B), a synchronization signal is continuously transmitted a plurality of times in a short period of time from the transmitter. In the example illustrated in FIG. 1(B), seven synchronization signals are continuously transmitted in a synchronization signal transmission cycle (Tf).

Then, the receiver receives only one signal among the continuously-transmitted synchronization signals. With this configuration, the receiver starts a reception operation earlier only by a time period Tm' (Tm'≤Tf), to thereby achieve the clock synchronization. Note that, after achieving the clock synchronization, the reception operation is stopped.

With this configuration, the receiver starts the reception operation earlier only by the time period Tm' (Tm'≤Tm), to thereby achieve the clock synchronization, and hence, compared to the conventional case in which the reception operation is started earlier by the time period Tm in consideration of the clock error, it is possible to reduce a time period used for the reception operation. Therefore, the receiver can achieve reduction in power consumption.

Figure 2:
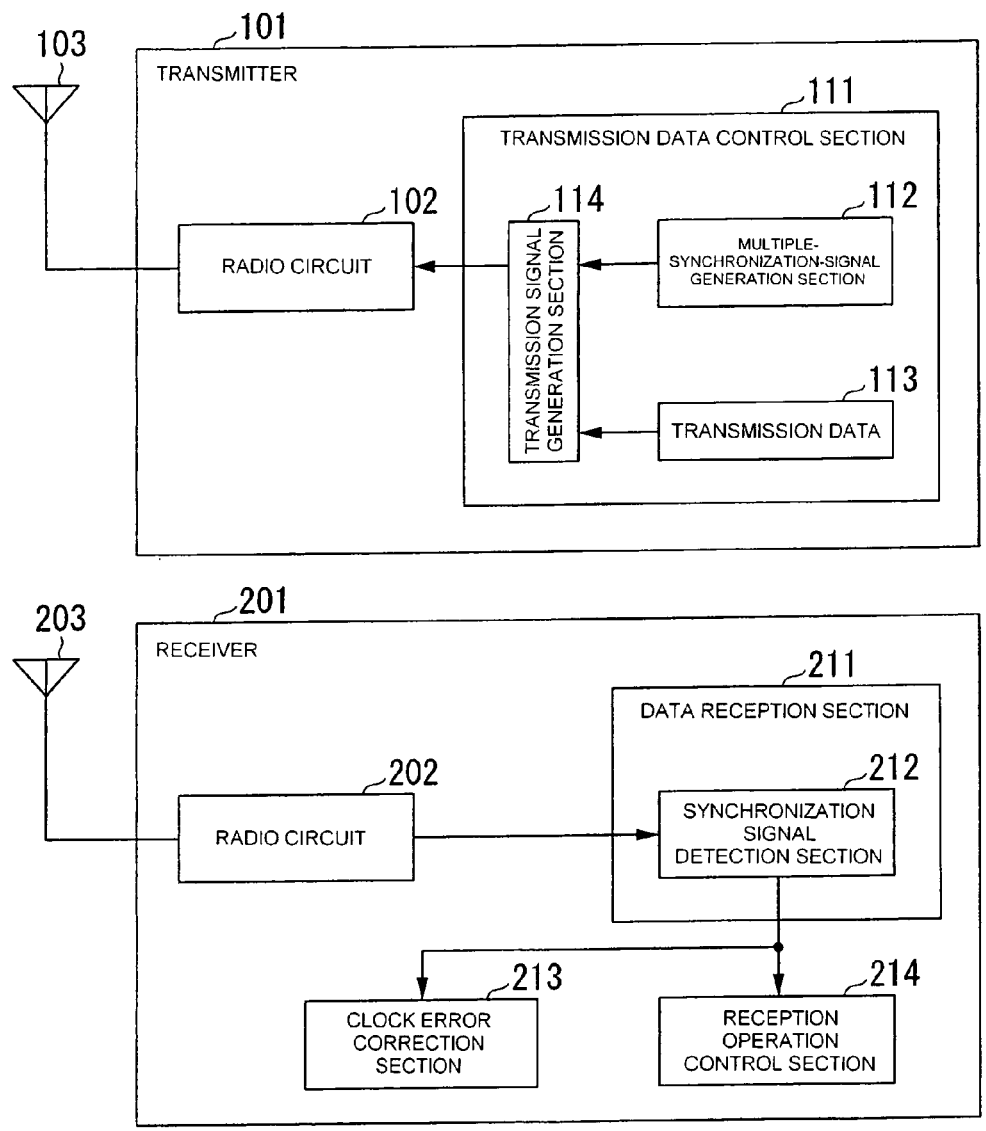
FIG. 2 is a diagram illustrating configurations of the transmitter and the receiver according to the first embodiment of the present invention.

Further, FIG. 2 is a diagram illustrating configurations of the transmitter and the receiver according to the first embodiment of the present invention, and is a diagram illustrating functional blocks of the transmitter and the receiver. In FIG. 2, a transmitter 101 and the receiver 201 perform communication by using TDMA radio frames.

The transmitter 101 includes a radio circuit 102 for transmitting/receiving a radio signal via an antenna 103, and a transmission data control section 111. The transmission data control section 111 includes a multiple-synchronization-signal generation section 112 for generating a plurality of synchronization signals, and also has transmission data 113 stored therein. Based on the synchronization signals generated by the multiple-synchronization-signal generation section 112 and the transmission data 113, a transmission signal generation section 114 generates a transmission signal to be transmitted using a radio frame.

The transmission signal containing the plurality of synchronization signals, which is generated by the transmission signal generation section 114, is transmitted by the radio circuit 102 to the receiver 201 via the antenna 103.

The receiver 201 includes a radio circuit 202 for transmitting/receiving the radio signal via an antenna 203, a data reception section 211, a reception operation control section 214, and a clock error correction section 213.

A synchronization signal detection section 212 of the data reception section 211 detects any one of the plurality of synchronization signals transmitted from the transmitter 101. Based on the synchronization signal detected by the synchronization signal detection section 212, the clock error correction section 213 performs correction so that a reference clock of the receiver 201 is synchronized with a clock of the transmitter 101. The reception operation control section 214 controls a data reception operation of the data reception section 211 based on the corrected reference clock.

Note that, the above-mentioned transmitter corresponds to the transmitter 101, and the above-mentioned receiver corresponds to the receiver 201. Further, function of the above-mentioned multiple-synchronization-signal transmission means is implemented by the multiple-synchronization-signal generation section 112, the transmission signal generation section 114, and the radio circuit 102. Further, the above-mentioned synchronization signal detection means corresponds to the synchronization signal detection section 212 of the data reception section 211. Further, the above-mentioned clock error correction means corresponds to the clock error correction section 213.

Figure 3:
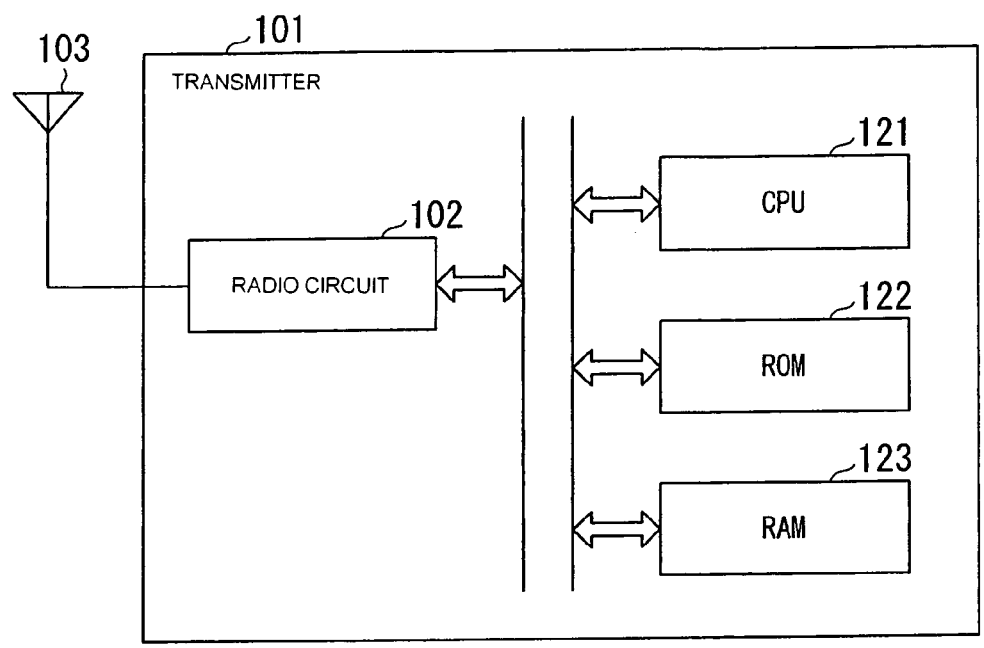
FIG. 3 is a diagram illustrating hardware configurations of the transmitter and the receiver.
Figure 3:
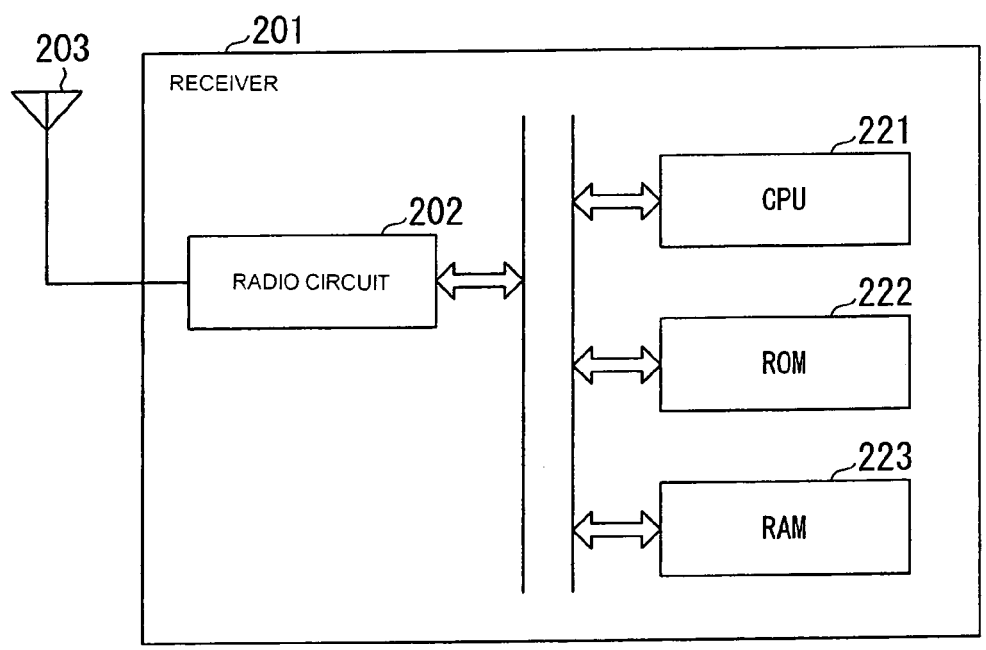

Further, FIG. 3 is a diagram illustrating hardware configurations of the transmitter 101 and the receiver 201 illustrated in FIG. 2. As illustrated in the figure, the transmitter 101 includes a computer system including a central processing unit (CPU) 121, a read only memory (ROM) 122, and a random access memory (RAM) 123.

Then, functions of processing performed by the transmission data control section 111, the multiple-synchronization-signal generation section 112 and the transmission signal generation section 114 of the transmission data control section 111, and the like are implemented by the CPU 121 reading a program from the ROM 122 or the like and executing the program (it is needless to say that the functions may be implemented by dedicated hardware).

Similarly, the receiver 201 includes a computer system including a CPU 221, a ROM 222, and a RAM 223. Then, functions of processing performed by the synchronization signal detection section 212, the clock error correction section 213, and the reception operation control section 214 are implemented by the CPU 221 reading a program from the ROM 222 or the like and executing the program (it is needless to say that the functions may be implemented by dedicated hardware).

Second Embodiment

Next, description is given of a second embodiment of the present invention. In the first embodiment, the clock of the receiver can be synchronized with the clock of the transmitter, but it is unclear which synchronization signal was used among the plurality of synchronization signals transmitted from the transmitter. It is thus impossible to detect a leading position of the synchronization signal when achieving the synchronization. Specifically, it is impossible to achieve the clock synchronization in accordance with the leading position of the radio signal or the position of a desired synchronization signal.

In the second embodiment of the present invention, description is given of an example in which the clock error is corrected in accordance with the leading or desired synchronization signal out of the plurality of synchronization signals.

FIGS. 4(A)-(D) are diagrams for describing operations of a transmitter and a receiver according to the second embodiment of the present invention.

The example illustrated in FIGS. 4(A)-4(D) is different from the first embodiment illustrated in FIG. 1(B) in that sequence numbers are added to the plurality of synchronization signals.

As illustrated in FIG. 4(A), the transmitter transmits the plurality of synchronization signals having sequence numbers (1), (2), . . . (7) assigned thereto. Then, as illustrated in FIG. 4(B), the receiver starts reception of the synchronization signals earlier by Tm', and, in the example of the figure, receives a sixth synchronization signal (6).

Based on the sequence number, the receiver, which has received the synchronization signal (6), can perform correction on an uncorrected clock illustrated in FIG. 4(C) in accordance with a timing of a synchronization signal (4), which is positioned at the center of the plurality of synchronization signals as illustrated in FIG. 4(D). It is needless to say that the correction may be performed in accordance with the timing of the leading synchronization signal (1).

As described above, by assigning the sequence numbers to the plurality of synchronization signals to be transmitted continuously from the transmitter, the receiver can detect the clock error based on the sequence number of the received synchronization signal, relative to the desired synchronization signal, to thereby perform correction on the reference clock.

Figure 5:
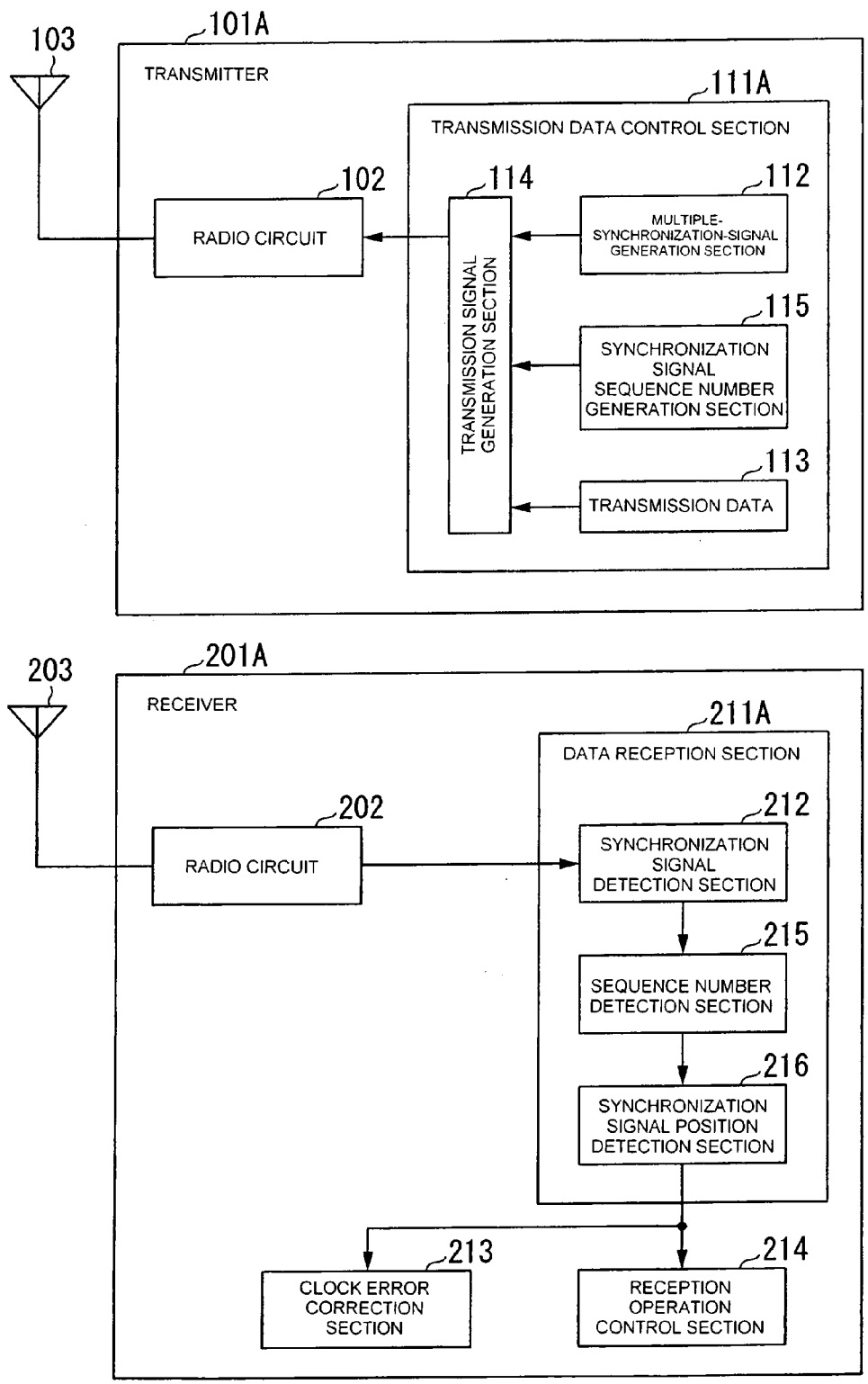
FIG. 5 is a diagram illustrating configurations of the transmitter and the receiver according to the second embodiment of the present invention.

FIG. 5 is a diagram illustrating configurations of the transmitter and the receiver according to the second embodiment of the present invention, and is a diagram illustrating functional blocks of the transmitter and the receiver.

A transmitter 101A illustrated in FIG. 5 is different in configuration from the transmitter 101 illustrated in FIG. 2 in that the transmitter 101A illustrated in FIG. 5 has a synchronization signal sequence number generation section 115 newly added to a transmission data control section 111A, and is the same as the transmitter 101 illustrated in FIG. 2 for the rest of the configuration. Accordingly, the same components are denoted by the same reference numerals, and repeated description is omitted.

The synchronization signal sequence number generation section 115 performs processing of assigning the sequence numbers to the respective synchronization signals generated by the multiple-synchronization-signal generation section 112.

Further, a receiver 201A illustrated in FIG. 5 is different in configuration from the receiver 201 illustrated in FIG. 2 in that the receiver 201A illustrated in FIG. 5 has a sequence number detection section 215 and a synchronization signal position detection section 216 newly added to a data reception section 211A, and is the same as the receiver 201 illustrated in FIG. 2 for the rest of the configuration. Accordingly, the same components are denoted by the same reference numerals, and repeated description is omitted.

The sequence number detection section 215 detects information on the sequence number contained in the synchronization signal received from the transmitter 101A. Further, based on the sequence number detected by the sequence number detection section 215, the synchronization signal position detection section 216 determines a temporal position of the synchronization signal (4) (see FIG. 4) positioned at the center, for example.

Note that, in FIG. 5, the above-mentioned identification information assigning means corresponds to the synchronization signal sequence number generation section 115. Further, the above-mentioned synchronization signal detection means corresponds to the synchronization signal detection section 212, the sequence number detection section 215, and the synchronization signal position detection section 216 of the data reception section 211A.

Note that, the hardware configurations of the transmitter and the receiver illustrated in FIG. 5 are the same as the hardware configurations according to the first embodiment illustrated in FIG. 3.

Figure 6:
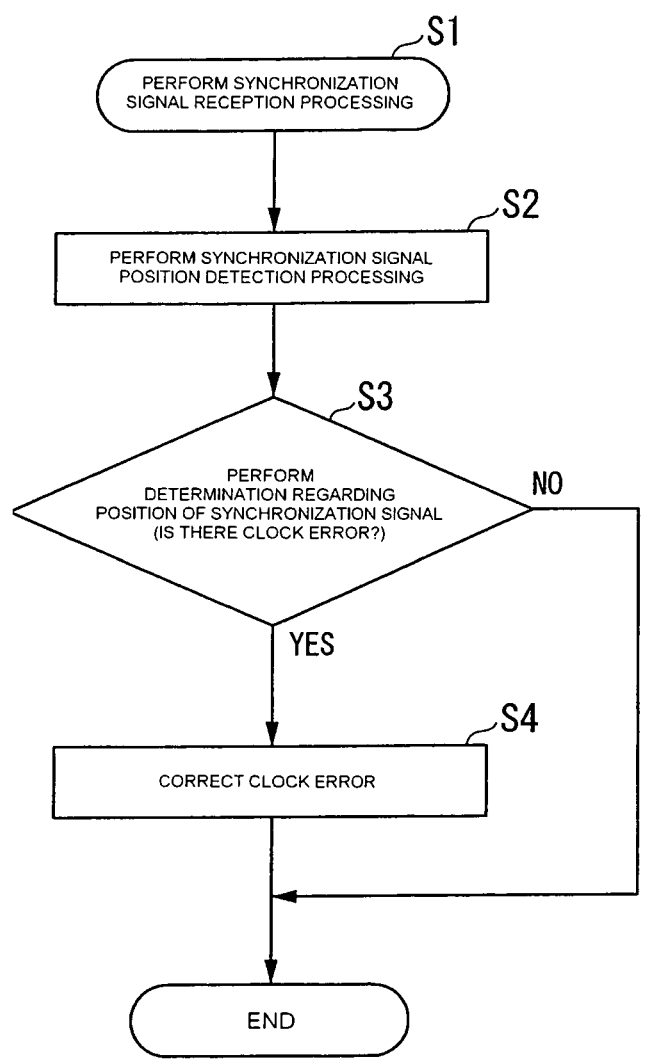
FIG. 6 is a flow chart illustrating a flow of clock error correction processing performed by the receiver according to the second embodiment.

Further, FIG. 6 is a flow chart illustrating a flow of clock error correction processing performed by the receiver according to the second embodiment described above. Hereinbelow, with reference to FIG. 6, the flow of the processing is described.

The receiver starts performing synchronization signal reception processing for receiving the synchronization signals (Step S1). Then, the receiver detects the plurality of synchronization signals transmitted from the transmitter, and also detects the temporal position and the sequence number of the detected synchronization signal (Step S2).

Figure 4:
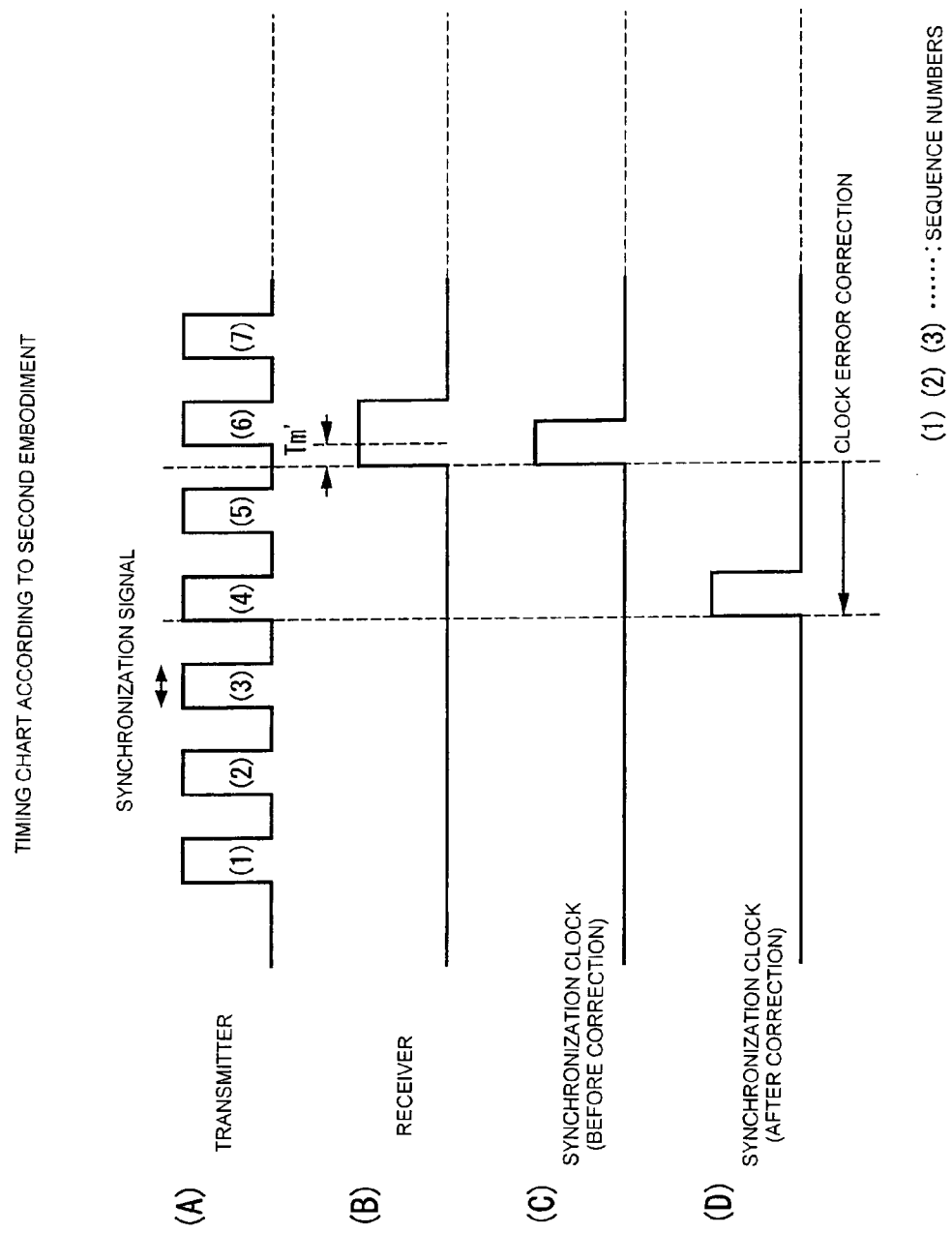
FIGS. 4(A)-4(D) are diagrams for describing operations of a transmitter and a receiver according to a second embodiment of the present invention.

Then, based on the detected temporal position and sequence number of the synchronization signal, a comparison is made between the position of the synchronization signal (in the example of FIG. 4, the position of the synchronization signal (4) positioned at the center) and the position of the reference clock of the receiver, to thereby determine whether or not there is a clock error (Step S3). When there is a clock error (Step S4: YES), the receiver performs the processing of correcting the clock error (Step S4). When there is no clock error (Step S3: No), the receiver does not perform the processing of correcting the clock error.

In this manner, the receiver detects any one of the plurality of synchronization signals transmitted from the transmitter, and thus can correct the clock error of its own.

Third Embodiment

Next, description is given of a third embodiment of the present invention. Similarly to the second embodiment, the third embodiment relates to an example in which the synchronization of the reference clock is achieved in accordance with the leading or arbitrary other synchronization signal out of the plurality of synchronization signals transmitted from the transmitter.

FIGS. 7(A)-7(D) are diagrams for describing operations of a transmitter and a receiver according to the third embodiment of the present invention.

The example illustrated in FIGS. 7(A)-7(D) is different from the first embodiment illustrated in FIG. 1(B) in that information on time stamp is added to the plurality of synchronization signals.

As illustrated in FIG. 7(A), the transmitter transmits the plurality of synchronization signals having time stamps T1, T2, . . . T7 assigned thereto. Then, as illustrated in FIG. 7(B), the receiver starts the reception of the synchronization signals earlier by Tm', and, in the example of the figure, receives a sixth synchronization signal T6.

Based on the time stamp, the receiver, which has received the synchronization signal T6, can perform correction on an uncorrected clock, that is, the reference clock illustrated in FIG. 7(C) in accordance with a timing of a synchronization signal T4, which is positioned at the center of the plurality of synchronization signals as illustrated in FIG. 7(D).

As described above, by assigning the time stamps to the plurality of synchronization signals to be transmitted continuously from the transmitter, the receiver can detect the clock error with respect to the transmitter based on the information on the time stamp of the received synchronization signal, to thereby perform correction on the reference clock.

Figure 8:
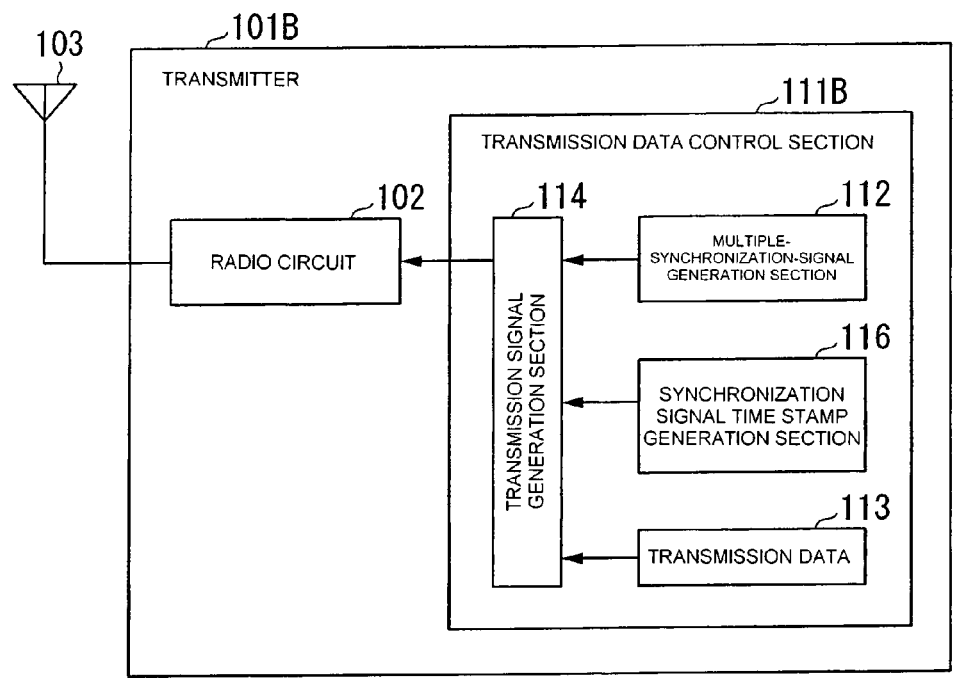
FIG. 8 is a diagram illustrating configurations of the transmitter and the receiver according to the third embodiment of the present invention.
Figure 8:
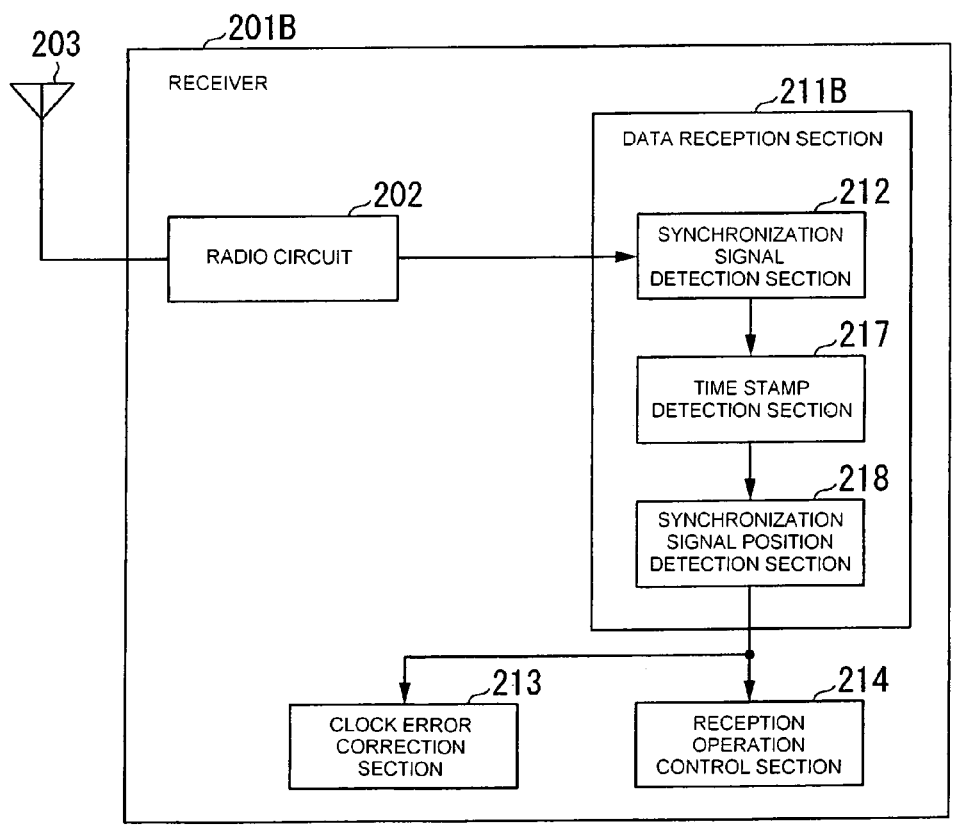

FIG. 8 is a diagram illustrating configurations of the transmitter and the receiver according to the third embodiment of the present invention, and is a diagram illustrating functional blocks of the transmitter and the receiver:

A transmitter 101B illustrated in FIG. 8 is different in configuration from the transmitter 101 according to the first embodiment illustrated in FIG. 2 in that the transmitter 101B illustrated in FIG. 8 has a synchronization signal time stamp generation section 116 newly added to a transmission data control section 111B, and is the same as the transmitter 101 illustrated in FIG. 2 for the rest of the configuration. Accordingly, the same components are denoted by the same reference numerals, and repeated description is omitted.

The synchronization signal time stamp generation section 116 performs processing of assigning the time stamps to the synchronization signals generated by the multiple-synchronization-signal generation section 112. As the time stamp, there may be used information on relative time generated based on a real time clock (RTC) or information on absolute time of the RTC itself.

Further, a receiver 201B illustrated in FIG. 8 is different in configuration from the receiver 201 illustrated in FIG. 2 in that the receiver 201B illustrated in FIG. 8 has a time stamp detection section 217 and a synchronization signal position detection section 218 newly added to a data reception section 211B, and is the same as the receiver 201 illustrated in FIG. 2 for the rest of the configuration. Accordingly, the same components are denoted by the same reference numerals, and repeated description is omitted.

The time stamp detection section 217 detects the information on the time stamp which is contained in the synchronization signal received from the transmitter 101B. Based on the information on the time stamp detected by the time stamp detection section 217, the synchronization signal position detection section 218 determines a temporal position of the synchronization signal T4 (see FIG. 7) positioned at the center, for example.

Note that, in FIG. 8, the above-mentioned identification information assigning means corresponds to the synchronization signal time stamp generation section 116. Further, the above-mentioned synchronization signal detection means corresponds to the synchronization signal detection section 212, the time stamp detection section 217, and the synchronization signal position detection section 218 of the data reception section 211B.

Further, the hardware configurations of the transmitter and the receiver illustrated in FIG. 8 are the same as the hardware configurations according to the first embodiment illustrated in FIG. 3. Further, the flow chart illustrated in FIG. 6 is applicable as well.

Hereinabove, the embodiments of the present invention have been described, and the radio communication system, the receiver, and the transmitter according to the present invention are not limited to the illustrative examples described above. It is needless to say that various modifications may be made without departing from the scope of the gist of the present invention.

INDUSTRIAL APPLICABILITY

As described above, according to the present invention, even if there is a clock error between the transmitter and the receiver, it is possible to reduce the operation time period of the reception circuit of the receiver, thereby enabling the power consumption to be reduced. Further, even if the operation time period of the receiver is short, the synchronization signal can be received, thereby enabling the error between the reference clocks of the transmitter and the receiver to be corrected. Further, the continuous transmission of the plurality of synchronization signals reduces influence due to the radio wave interference.

REFERENCE SIGNS LIST 101, 101A, 101B, 101C transmitter
102 radio circuit
103 antenna
111, 111A, 111B, 111C transmission data control section
112 multiple-synchronization-signal generation section
112C synchronization signal generation section
113 transmission data
114 transmission signal generation section
115 synchronization signal sequence number generation section
116 synchronization signal time stamp generation section
201, 201A, 201B, 201C receiver
202 radio circuit
203 antenna
211, 211A, 211B, 211C data reception section
212 synchronization signal detection section
213 clock error correction section
214 reception operation control section
215 sequence number detection section
216 synchronization signal position detection section
217 time stamp detection section
218 synchronization signal position detection section

DRAWINGS

FIG. 1
(1) COMPARISON OF OPERATIONS OF RECEIVERS BETWEEN PRIOR ART AND PRESENT INVENTION
(2) CLOCK ERROR BETWEEN TRANSMITTER AND RECEIVER (±Tm AT MAXIMUM)
(3) SYNCHRONIZATION SIGNAL
(4) TRANSMITTER
(5) PRIOR ART
(6) RECEIVER
(7) SYNCHRONIZATION SIGNAL TRANSMISSION CYCLE (Tf)
(8) PRESENT INVENTION
FIG. 2
102 RADIO CIRCUIT
111 TRANSMISSION DATA CONTROL SECTION
112 MULTIPLE-SYNCHRONIZATION-SIGNAL GENERATION SECTION
113 TRANSMISSION DATA
114 TRANSMISSION SIGNAL GENERATION SECTION
211 DATA RECEPTION SECTION

Figure 7:
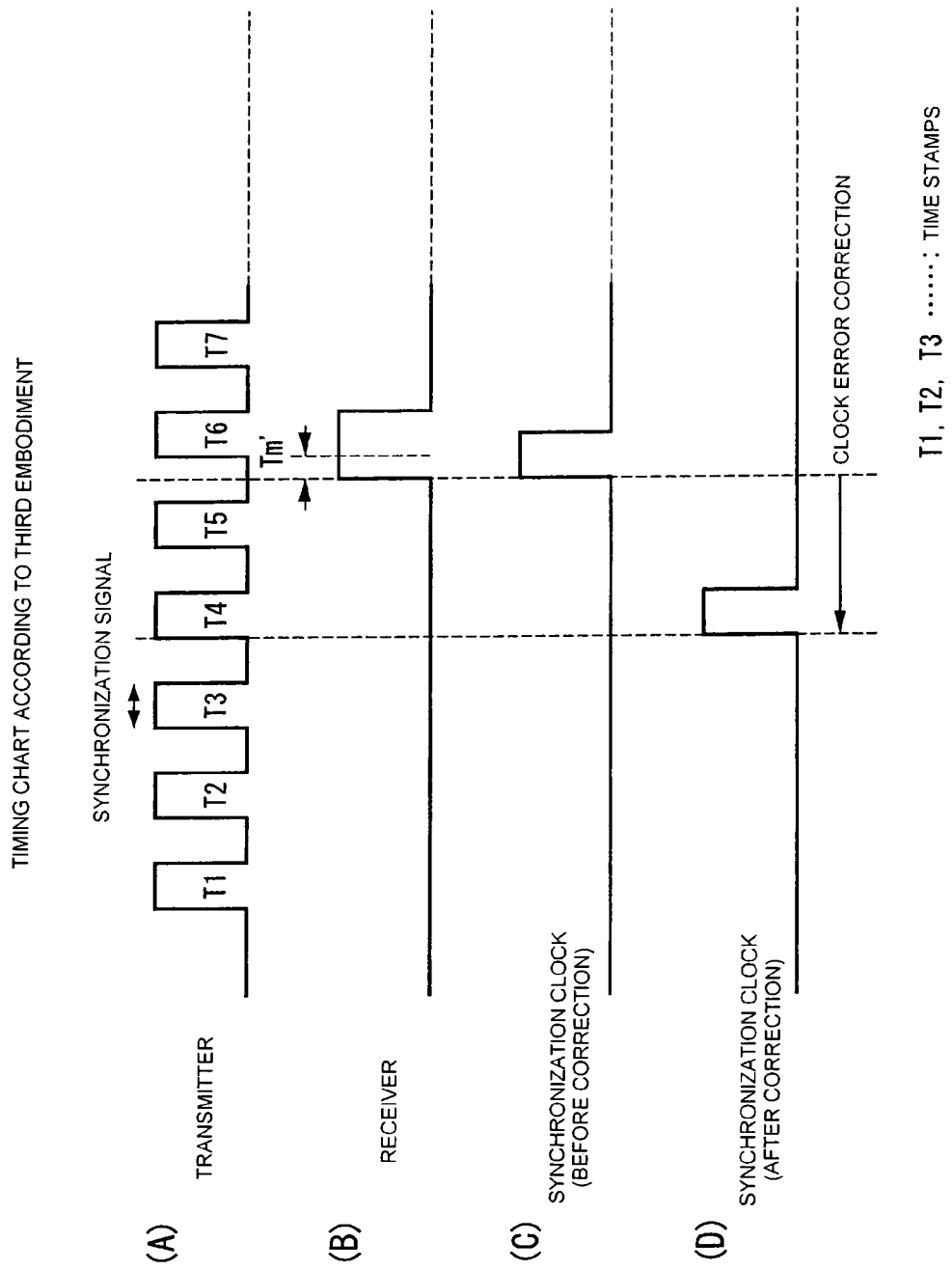
FIGS. 7(A)-7(D) are diagrams for describing operations of a transmitter and a receiver according to a third embodiment of the present invention.
Figure 9:
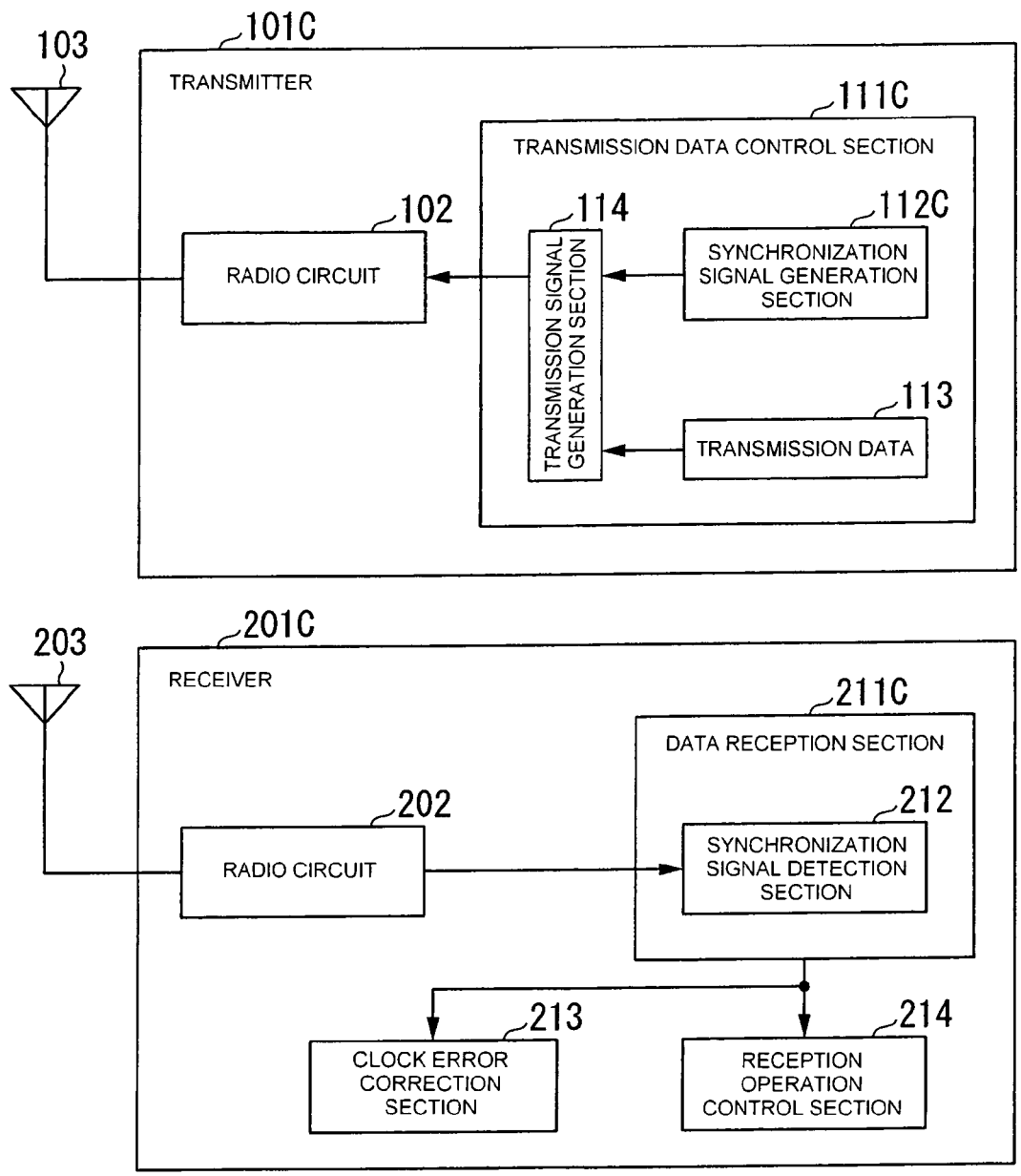
FIG. 9 is a diagram illustrating an example of configurations of a conventional transmitter and a conventional receiver.
Figure 10:
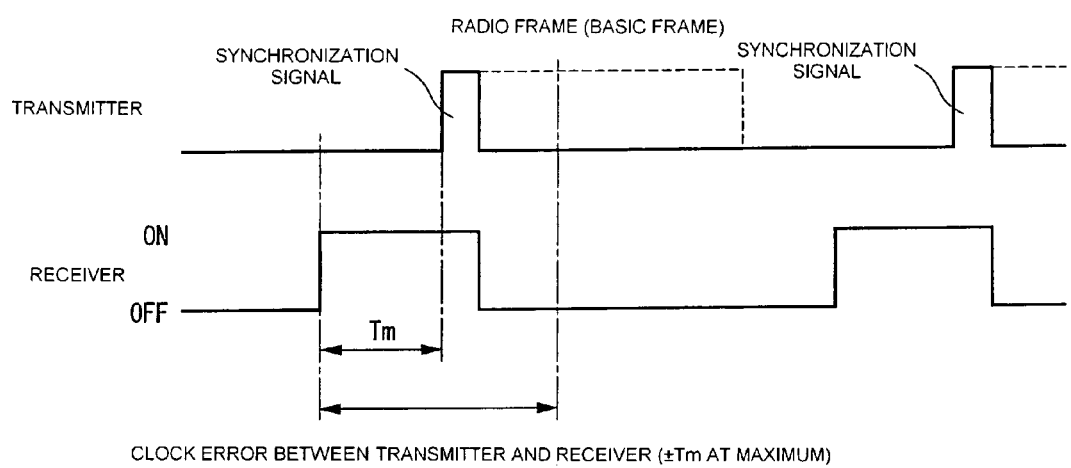
FIG. 10 is a diagram for describing a clock correction operation performed by the conventional transmitter and the conventional receiver.

212 SYNCHRONIZATION SIGNAL DETECTION SECTION
213 CLOCK ERROR CORRECTION SECTION
214 RECEPTION OPERATION CONTROL SECTION
FUNCTIONAL BLOCK DIAGRAM ACCORDING TO FIRST EMBODIMENT
FIG. 3
HARDWARE CONFIGURATIONS OF TRANSMITTER AND RECEIVER
FIG. 4
(1) TIMING CHART ACCORDING TO SECOND EMBODIMENT
(2) SYNCHRONIZATION CLOCK (BEFORE CORRECTION)
(3) SYNCHRONIZATION CLOCK (AFTER CORRECTION)
(4) CLOCK ERROR CORRECTION
(5) SEQUENCE NUMBERS
FIG. 5
115 SYNCHRONIZATION SIGNAL SEQUENCE NUMBER GENERATION SECTION
215 SEQUENCE NUMBER DETECTION SECTION
216 SYNCHRONIZATION SIGNAL POSITION DETECTION SECTION
FUNCTIONAL BLOCK DIAGRAM ACCORDING TO SECOND EMBODIMENT
FIG. 6
S1 PERFORM SYNCHRONIZATION SIGNAL RECEPTION PROCESSING
S2 PERFORM SYNCHRONIZATION SIGNAL POSITION DETECTION PROCESSING
S3 PERFORM DETERMINATION REGARDING POSITION OF SYNCHRONIZATION SIGNAL (IS THERE CLOCK ERROR?)
S4 CORRECT CLOCK ERROR
(1) PROCESSING FLOW OF RECEIVER
(2) END
FIG. 7
(1) TIMING CHART ACCORDING TO THIRD EMBODIMENT
(2) TIME STAMPS
FIG. 8
116 SYNCHRONIZATION SIGNAL TIME STAMP GENERATION SECTION
217 TIME STAMP DETECTION SECTION
FUNCTIONAL BLOCK DIAGRAM ACCORDING TO THIRD EMBODIMENT
FIG. 9
112C SYNCHRONIZATION SIGNAL GENERATION SECTION
FUNCTIONAL BLOCK DIAGRAM ACCORDING TO PRIOR ART
FIG. 10
RADIO FRAME (BASIC FRAME)

The invention claimed is:

1. A radio communication system, comprising:
a transmitter for transmitting a plurality of synchronization signals in a predetermined transmission cycle; and
a receiver having set therein in advance a reception interval for receiving the synchronization signals from the transmitter, the receiver being configured to be activated with the reception interval and to correct an error of a reference clock by detecting the synchronization signals transmitted from the transmitter;
wherein the transmitter comprises:
identification information assigning means for assigning a sequence number to each of the synchronization signals; and
multiple-synchronization-signal transmission means for continuously transmitting the synchronization signals a plurality of times from a start time of the predetermined transmission cycle and with an interval shorter than the predetermined transmission cycle; and
wherein the receiver comprises:
synchronization signal detection means for receiving, after activation of the receiver, any one of the synchronization signals transmitted from the transmitter; and
clock error correction means for correcting the error of the reference clock based on the sequence number assigned to the any one of the received synchronization signals.

2. A radio communication system according to claim 1, wherein the plurality of synchronization signals comprises an odd number of synchronization signals; and wherein when correcting the error of the reference clock based on the sequence number assigned to the received synchronization signal, the clock error correction means determines a temporal position of a synchronization signal positioned at a center among the synchronization signals based on the sequence number assigned to the received synchronization signal, and corrects the error of the reference clock based on the determined temporal position of the synchronization signal positioned at the center.

3. A receiver which is used in a radio communication system, the radio communication system comprising:
a transmitter for transmitting a plurality of synchronization signals in a predetermined transmission cycle, assigning a sequence number to each of the synchronization signals, and continuously transmitting, from a start time of the predetermined transmission cycle, the synchronization signals a plurality of times with an interval shorter than the predetermined transmission cycle; and
the receiver having set therein in advance a reception interval for receiving the synchronization signals from the transmitter, the receiver being configured to be activated with the reception interval and to correct an error of a reference clock by detecting the synchronization signals transmitted from the transmitter;
the receiver comprising:
synchronization signal detection means for receiving, after activation of the receiver, any one of the synchronization signals transmitted from the transmitter; and
clock error correction means for correcting the error of the reference clock based on the sequence number assigned to any one of the received synchronization signals.

4. A receiver which is used in a radio communication system, the radio communication system comprising:
a transmitter for transmitting a plurality of odd-numbered synchronization signals in a predetermined transmission cycle, assigning a sequence number to each of the plurality of synchronization signals, and continuously transmitting the synchronization signals having the sequence number assigned thereto from a start time of the predetermined transmission cycle and a plurality of times with an interval shorter than the predetermined transmission cycle; and
the receiver having set therein in advance a reception interval for receiving the synchronization signals from the transmitter, the receiver being configured to be activated with the reception interval and to correct an error of a reference clock by detecting the synchronization signals transmitted from the transmitter;

the receiver comprising:

synchronization signal detection means for receiving, after activation of the receiver, any one of the synchronization signals transmitted from the transmitter; and clock error correction means for determining a temporal position of a synchronization signal positioned at a center among the synchronization signals based on the sequence number assigned to any one of the received synchronization signals, and for correcting the error of the reference clock based on the determined temporal position of the synchronization signal positioned at the center.

5. A transmitter which is used in a radio communication system, the radio communication system comprising:

the transmitter for transmitting a plurality of synchronization signals in a predetermined transmission cycle; and a receiver having set therein in advance a reception interval for receiving the synchronization signals from the transmitter, the receiver being configured to be activated with the reception interval and to correct an error of a reference clock by detecting the synchronization signals transmitted from the transmitter;

the transmitter comprising:

identification information assigning means for assigning a sequence number to each of the synchronization signals; and multiple-synchronization-signal transmission means for continuously transmitting, from a start time of the predetermined transmission cycle, the synchronization signal a plurality of times with an interval shorter than the predetermined transmission cycle;

wherein the receiver receives, after the activation, any one of the plurality of the synchronization signals transmitted from the transmitter, and corrects the error of the reference clock based on the sequence number assigned to any one of the received synchronization signals.

6. A transmitter which is used in a radio communication system, the radio communication system comprising:

the transmitter for transmitting a plurality of odd-numbered synchronization signals in a predetermined transmission cycle; and a receiver having set therein in advance a reception interval for receiving the synchronization signals from the transmitter, the receiver being configured to be activated with the reception interval and to correct an error of a reference clock by detecting the synchronization signals transmitted from the transmitter;

the transmitter comprising:

identification information assigning means for assigning a sequence number to each of the plurality of the synchronization signals; and multiple-synchronization-signal transmission means for continuously transmitting the synchronization signal having the sequence number assigned thereto from a start time of the predetermined transmission cycle and a plurality of times with an interval shorter than the predetermined transmission cycle;

wherein the receiver receives, after the activation, any one of the plurality of the synchronization signals transmitted from the transmitter, determines a temporal position of a synchronization signal positioned at a center among the plurality of synchronization signals based on the sequence number assigned to the any one of the received synchronization signals, and corrects the error of the reference clock based on the determined temporal position of the synchronization signal positioned at the center.

* * * * *